United States Patent
Stivers

(10) Patent No.: US 6,530,981 B2
(45) Date of Patent: Mar. 11, 2003

(54) ELECTROINERTIAL GAS CLEANER

(76) Inventor: Scotlund Stivers, P.O. Box 241, Superior, WI (US) 54880

( * ) Notice: Subject to any disclaimer, the term of this patent is extended or adjusted under 35 U.S.C. 154(b) by 0 days.

(21) Appl. No.: 09/911,252

(22) Filed: Jul. 23, 2001

(65) Prior Publication Data
US 2002/0017194 A1 Feb. 14, 2002

Related U.S. Application Data
(60) Provisional application No. 60/220,609, filed on Jul. 25, 2000.

(51) Int. Cl.⁷ .............................. B03C 3/36; B03C 3/78
(52) U.S. Cl. ...................... 96/44; 95/75; 95/78; 96/50; 96/61; 96/88; 96/92; 96/228
(58) Field of Search ............................. 96/61, 44, 50, 96/52, 88, 92, 228; 95/71, 78, 75

(56) References Cited

U.S. PATENT DOCUMENTS

| | | | | |
|---|---|---|---|---|
| 2,081,772 A | * | 5/1937 | Saint-Jacques ................. 96/61 |
| 4,352,681 A | * | 10/1982 | Dietz ............................. 96/61 |
| 4,649,703 A | * | 3/1987 | Dettling et al. ............. 96/61 X |
| 4,689,951 A | * | 9/1987 | Polach ....................... 96/61 X |
| 5,683,494 A | * | 11/1997 | Altman et al. .............. 96/61 X |
| 5,914,454 A | * | 6/1999 | Imbaro et al. .............. 96/61 X |
| 5,968,231 A | * | 10/1999 | Parmentier et al. ......... 96/50 X |
| 6,017,381 A | * | 1/2000 | Dunn et al. ................. 96/52 X |
| 6,228,148 B1 | * | 5/2001 | Aaltonen et al. ........... 96/44 X |

* cited by examiner

Primary Examiner—Richard L. Chiesa

(57) ABSTRACT

A device for cleaning a gas, which combines together in a single unit an Inertial Separator and an Electrostatic Precipitator, so as to reduce or eliminate the shortcomings of the latter two types of devices when they are used separately, and to synergistically enhance the efficiency and effectiveness compared to when they are operated separately in series.

1 Claim, 1 Drawing Sheet

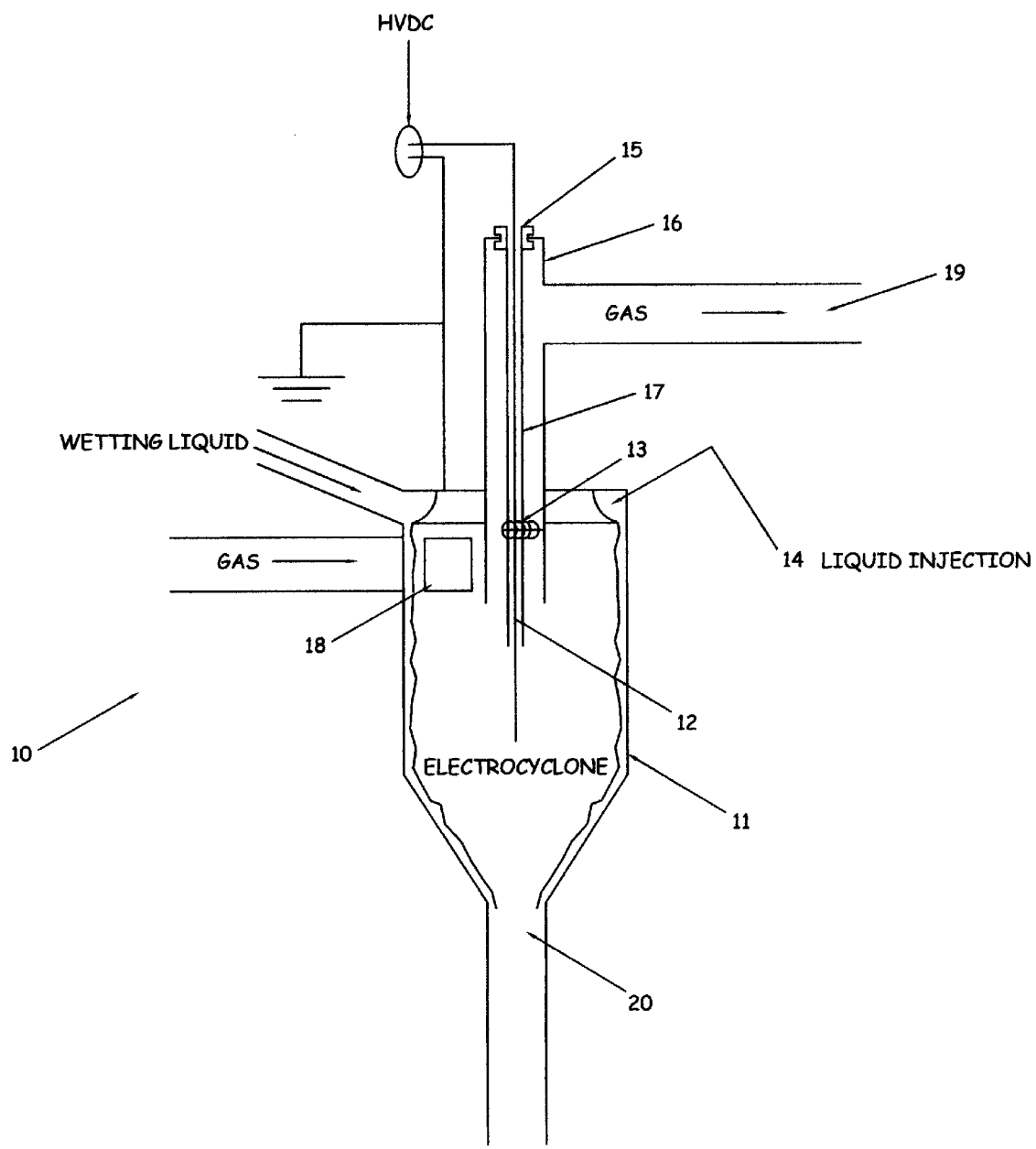

ELECTROINERTIAL GAS CLEANER

CROSS REFERENCE TO RELATED APPLICATIONS

Subject matter was disclosed in provisional application serial No. 60/220,609 filed at United States Patent Office on Jul. 25, 2000. +gi

STATEMENT REGARDING FEDERALLY SPONSORED RESEARCH OR DEVELOPMENT

The invention was NOT made by an agency of the United States Government NOR was it under contract with an agency of the United States Government.

BACKGROUND OF INVENTION:

1. Field of the Invention

This invention relates generally to the cleaning of gases of all types.

2. Description of the Invention

The concept of Inertial Separators, such as the Cyclone, are well known in the art, and utilize the relatively high inertia of the solid and liquid particles in the gas stream to separate them from the gas stream. Shortcomings of inertial separators include inability to remove smaller particles, and inability to reduce particulate content of the gas stream to a point where it would be suitable for most uses or meet most air quality standards without additional gas cleaning.

The concept of Electrostatic Precipitators is likewise well known in the art, and typically utilizes an electrostatic field between two or more electrodes charged with HVDC or pulsed DC Electricity to deflect particles out of a gas stream. Shortcomings of this type of system include extreme sensitivity to overloads of particles, and sneakage (some of the gas with entrained particles going through the system in such a way so as to bypass the electrostatic field(s), and hence not be cleaned).

The present invention combines electrostatic precipitators into various types of inertial separators, partially or completely eliminating the shortcomings of both earlier types, and synergistically enhancing the effectiveness so as to be more efficient and effective than a traditional inertial separator and traditional electrostatic precipitator connected and operated in series, as well as saving in space and materials of construction.

3. BRIEF SUMMARY OF THE INVENTION

Briefly, the invention comprises one or more conventional inertial separator(s) with one or more conventional inertia separator(s) having one or more electrodes installed therein and insulated from part or all of the inertial separator(s). It should be noted that one or more conventional parts of the inertial separator(s) can also be insulated from other parts of the inertial separator(s) and used to function as electrodes. The electrostatic field can be maintained between different parts of the inertial separator(s), between one (or more) added electrodes and the inertial separator, or between two or more added electrodes.

4. BRIEF DESCRIPTION OF THE DRAWING

The sole drawing figure shows a cutaway side view of the preferred embodiment, an Electrocyclone (a Cyclone-type Inertial Separator combined with an Electrostatic Precipitator)

5. DESCRIPTION OF THE PREFERRED EMBODIMENT

Referring to the drawing, reference numeral 10 generally identifies my Electroinertial Gas Cleaner device comprising a conventional Cyclone Separator constructed of metal (or some other electrically conductive material) with an electrically charged (while in operation, of course) electrode 12, electrically insulated from Cyclone Separator 11 by insulator or 13 and suspended vertically down the center of Cyclone Separator 11, with Cyclone Separator 11 acting as the other electrode, the collection electrode (the electrode to which the particles are attracted and upon which they collect). The interior of the outside sidewalls of Cyclone Separator 11 are continually wetted with and washed with water and/or other liquid from liquid injectors 14 so as to prevent re-entrainment of particles, and to prevent particles from sticking to the sidewalls. The vertical electrode 12 enters through a glass insulator 15 at the top of the discharge pipe tee 16 and goes down into the Cyclone Separator 11 and is encased in a glass tube 17 until after it is well clear of the discharge pipe tee 16 (so as to prevent arcing between the vertical electrode 12, and the discharge pipe tee 16). When in operation, a high voltage direct current potential difference is established and maintained between the vertical electrode 12 and Cyclone Separator 11, creating an electrostatic field between them and causing any particles that come between them to be electrically deflected towards the wetted interior sidewall of Cyclone Separator 11. Hence, when particle-laden gas enters the side port 18 of Cyclone Separator 11, the gas and particles hurl around the interior sidewalls of Cyclone Separator 11, and the particles are subjected to BOTH centrifugal forces due to the particle inertia, and to electrostatic forces of the electrostatic field between the vertical electrode 12 and the sidewalls of Cyclone Separator 11, both forces tending to propel the particles against the wetted interior sidewall of Cyclone Separator 11 resulting in the entrainment of the particles in the wetting liquid, which washes them downwards and out via sludge discharge port 20. The then clean gas is displaced inwards towards the center of the device by more entering gas and is ultimately pushed up the center through the discharge pipe tee 16 and out gas discharge port 19. Cyclone Separator 11 is grounded at all times for reasons of safety.

I claim:

1. An electroinertial gas cleaner comprising:

a grounded metal cyclone separator comprising sidewalls, a particle-laden gas inlet side port located on an exterior surface of said sidewalls, liquid injectors for continually wetting and washing with liquid the interior surfaces of said sidewalls, a discharge pipe tee extending vertically downwardly from a point above said cyclone separator to a point within said cyclone separator, said discharge pipe tee comprising a horizontally extending cleaned gas discharge port, said cyclone separator further comprising a sludge discharge port located on a bottom wall of said cyclone separator;

a vertical electrode extending downwardly through said discharge pipe tee, said electrode entering said tee through a glass insulator located at the top of said tee, said electrode extending further downwardly through said tee and encased in a vertical glass tube positioned within said tee, the bottom end of said electrode located within said cyclone separator below the bottom ends of both said tee and said glass tube, said electrode electrically insulated from said cyclone separator by another insulator positioned between said glass tube and said tee; and a high voltage direct current supply establishing and maintaining a potential difference between said vertical electrode and said cyclone separator sidewalls which act as a collection electrode, thereby creating an electrostatic field and causing any particles passing between them to be electrically deflected towards the wetted interior surfaces of said cyclone separator sidewalls, said particles being subjected to both centrifugal and electrostatic forces resulting in the entrainment of said particles in the wetting liquid and exit through said sludge discharge port.

* * * * *